(12) United States Patent
Schmitz et al.

(10) Patent No.: US 9,525,345 B2
(45) Date of Patent: Dec. 20, 2016

(54) ARRANGEMENT FOR IMPROVING TRANSIENT DEVIATION COMPENSATION OF AN OUTPUT VOLTAGE OF A DC-TO-DC CONVERTER

(71) Applicant: ZENTRUM MIKROELEKTRONIK DRESDEN AG, Dresden (DE)

(72) Inventors: Richard Maria Schmitz, Scottsdale, AZ (US); Eric Marschalkowski, Inning am Ammersee (DE); Ed Lam, Fremont, CA (US)

(73) Assignee: Zentrum Mikroelektronik Dresden AG, Dresden (DE)

( * ) Notice: Subject to any disclaimer, the term of this patent is extended or adjusted under 35 U.S.C. 154(b) by 80 days.

(21) Appl. No.: 13/936,467

(22) Filed: Jul. 8, 2013

(65) Prior Publication Data
US 2014/0028273 A1   Jan. 30, 2014

Related U.S. Application Data

(60) Provisional application No. 61/668,691, filed on Jul. 6, 2012.

(51) Int. Cl.
*G05F 1/00* (2006.01)
*H02M 3/158* (2006.01)
(Continued)

(52) U.S. Cl.
CPC .......... *H02M 3/158* (2013.01); *H02M 3/1584* (2013.01); *H02M 2001/0048* (2013.01); *H02M 2003/1566* (2013.01); *Y02B 70/1491* (2013.01)

(58) Field of Classification Search
CPC ............... H02M 3/158; H02M 3/1584; H02M 2001/0048; H02M 2003/1566; Y02B 70/1491
(Continued)

(56) References Cited

U.S. PATENT DOCUMENTS

| 7,902,805 | B2 * | 3/2011 | Gibson et al. | 323/284 |
| 2004/0036450 | A1 * | 2/2004 | Aiello et al. | 323/222 |

(Continued)

OTHER PUBLICATIONS

Machine translated document of JP2006-211760, Date Oct. 2006, Power Supply Electronc, Ryotaro et al.*

*Primary Examiner* — Jessica Han
*Assistant Examiner* — Lorena Bruner
(74) *Attorney, Agent, or Firm* — Heslin Rothenberg Farley & Mesiti P.C.

(57) ABSTRACT

When generating a voltage $V_{out}$ of a DC-to-DC converter for a load which is connected to the converter, it is necessary to monitor the quality of the voltage, in particular its amplitude. For this, provision is made for a comparator to be arranged between the output of the DC-to-DC converter and a control input of the control unit, with a first input of the comparator being connected to the output of the DC-to-DC converter ($V_{out}$), the second input of the comparator being connected to a reference voltage ($V_{restore}$) and the output of the comparator being connected to the control input of the control unit of the DC-to-DC converter, for controlling the voltage $V_{out}$.

10 Claims, 5 Drawing Sheets

Figure 1:
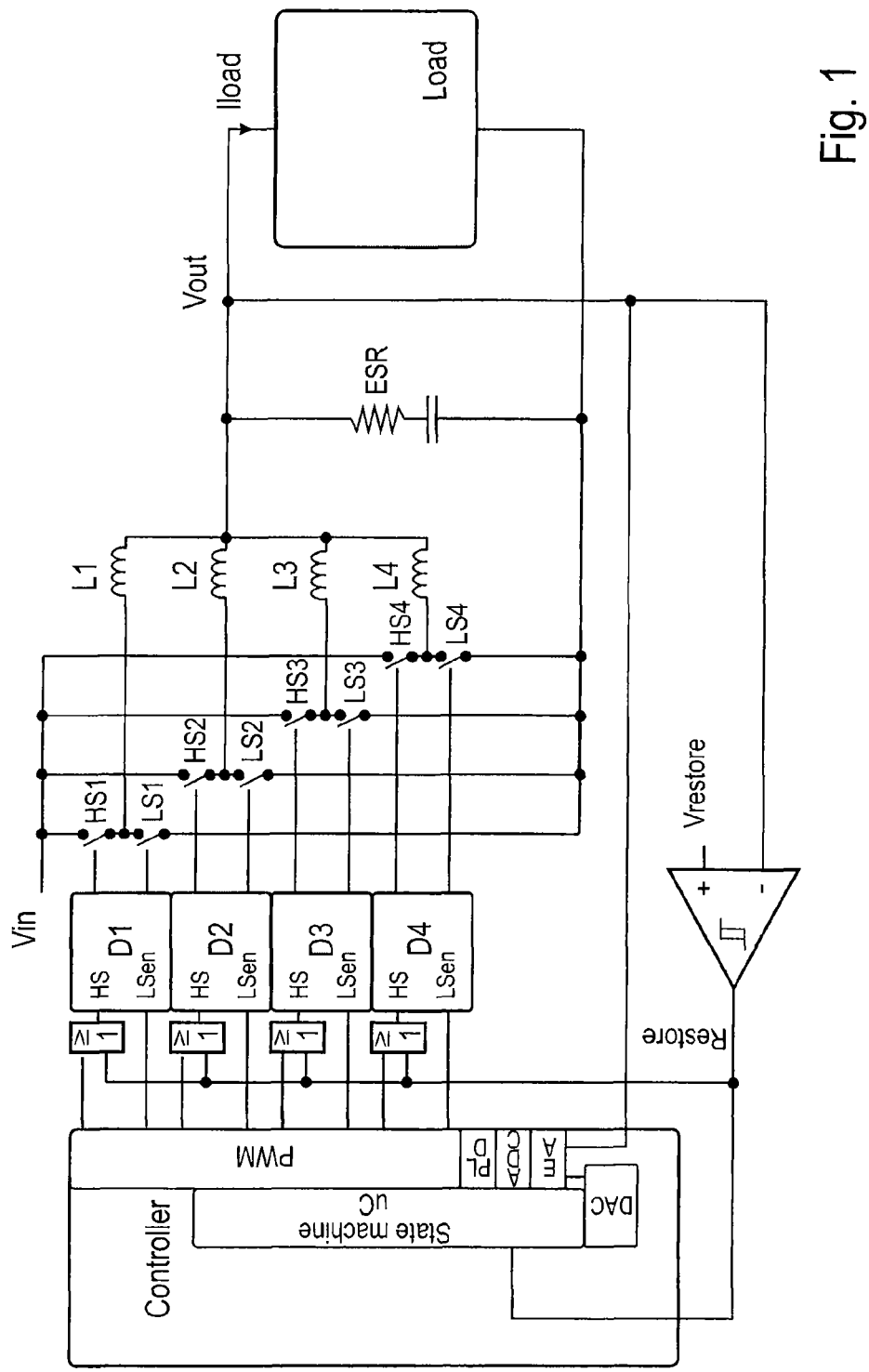

(51) Int. Cl.
*H02M 1/00* (2006.01)
*H02M 3/156* (2006.01)

(58) Field of Classification Search
USPC ....... 323/243, 222, 220, 283, 284, 281, 286, 323/285, 282, 271; 363/63, 124, 98, 132, 363/24, 134, 65
See application file for complete search history.

(56) References Cited

U.S. PATENT DOCUMENTS

2010/0026259 A1* 2/2010 Ozaki .................. H02M 3/156
 323/282
2011/0080102 A1* 4/2011 Ge ..................... H05B 33/0815
 315/200 R

* cited by examiner

ARRANGEMENT FOR IMPROVING TRANSIENT DEVIATION COMPENSATION OF AN OUTPUT VOLTAGE OF A DC-TO-DC CONVERTER

CROSS REFERENCE TO RELATED APPLICATIONS

This application claims priority of provisional application Ser. No. 61/668,691 filed on Jul. 6, 2012, the entire contents of which is hereby incorporated by reference herein.

BACKGROUND OF THE INVENTION

Voltage regulators can generally only compensate for rapid transient load changes to a limited extent, i.e. the output voltage thereof experiences deviations from the control voltage, so-called transient deviations, depending on the extent of the load change. The implemented control loops compensate for these control deviations generally over time. In the case of switching converters, this is particularly problematic since they are usually operated in various operating modes for optimizing their efficiency. Thus, a distinction is generally drawn between the discontinuous mode (DCM) and the continuous mode (CCM). In this case, the transition between the modes can take place continuously or in a manner triggered by thresholds by virtue of measuring a value proportional to the load current. The mentioned control deviations have a particularly negative effect in the case of switching converters since, for example on transition from a low load to a high load, the speed at which the connected coil can follow the load current changes is limited by its inductance and the speed of the implemented control loop. It should be noted that the implemented control loops generally need to meet stability criteria which make these control loops slow and therefore the transient deviation unnecessarily great.

The principle illustrated here makes it possible to compensate for transient deviations in accordance with the physical limitation of the coils used outside the conventional control loops. The physical and electrical properties of the components used in the system are used to detect and compensate for load current changes.

The principle illustrated is not restricted to an arrangement for generating one voltage. Such arrangements can also generate several voltages, for example two, three or four.

For optimum system performance, provision is made for an automatic reproduction of the voltage amplitude or phase angles to take place without the need for a communication with a user.

BRIEF SUMMARY OF THE INVENTION

The principle illustrated enables improved compensation of transient deviations of the control voltage ($V_{out}$). For this purpose, a control signal is provided which engages in the conventional control loop even before said control loop can correct the control deviations. Provision is made for this control signal to end the monitoring of the control voltage at a favorable point in time, and this monitoring is then resumed again by the conventional control loop.

BRIEF DESCRIPTION OF THE DRAWING FIGURES

Figure 2:
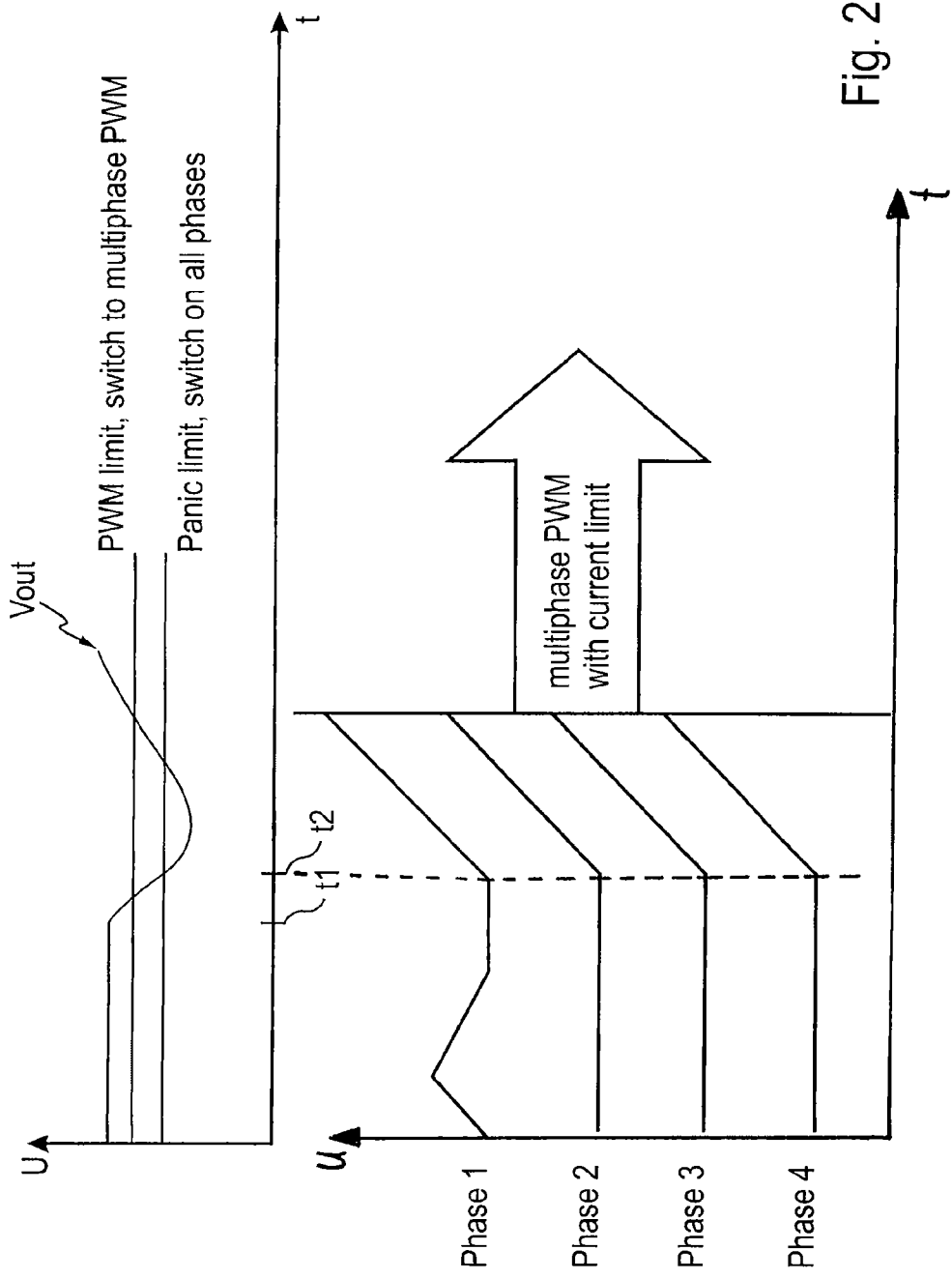
Figure 3:
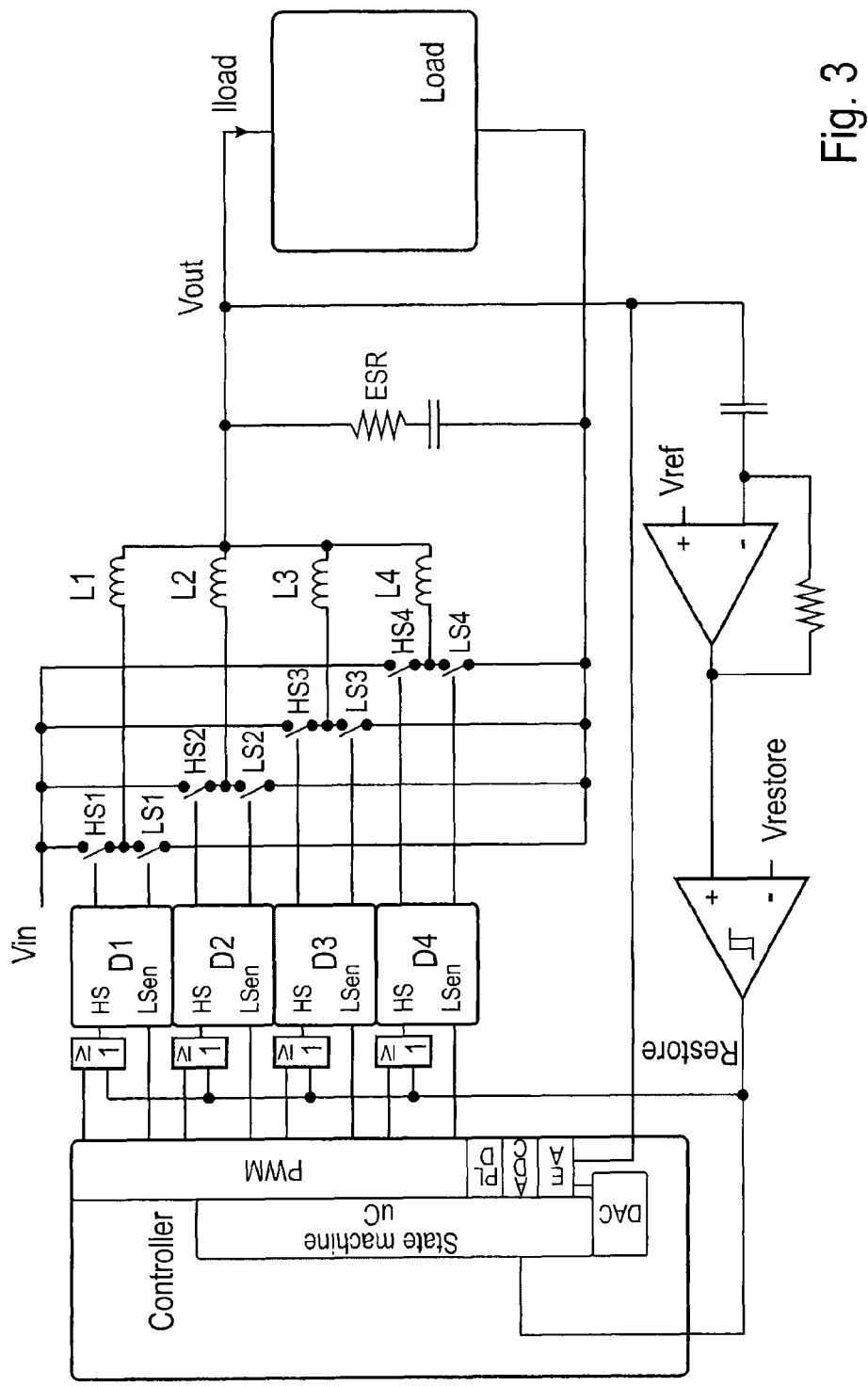
Figure 4:
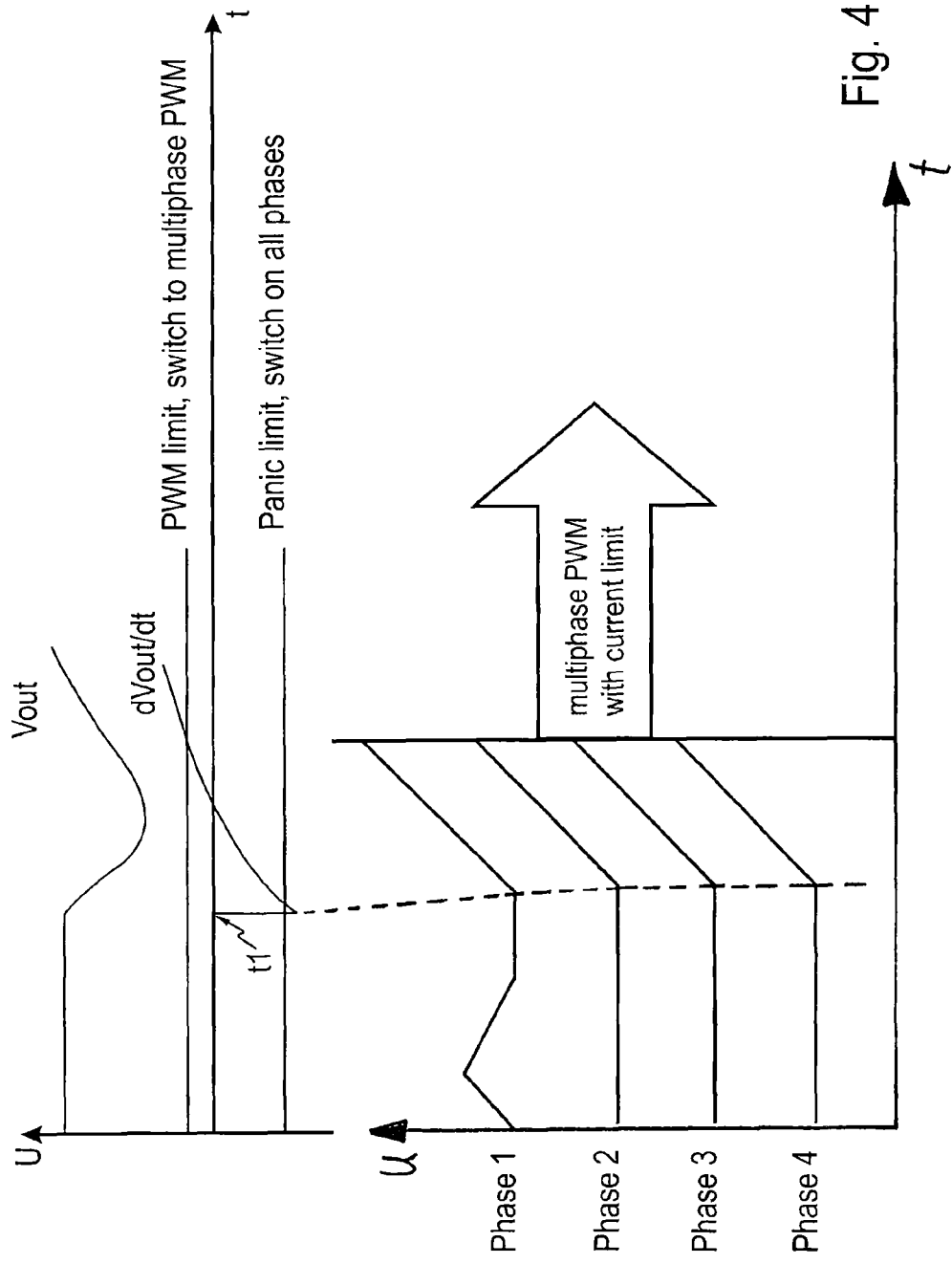
Figure 5:
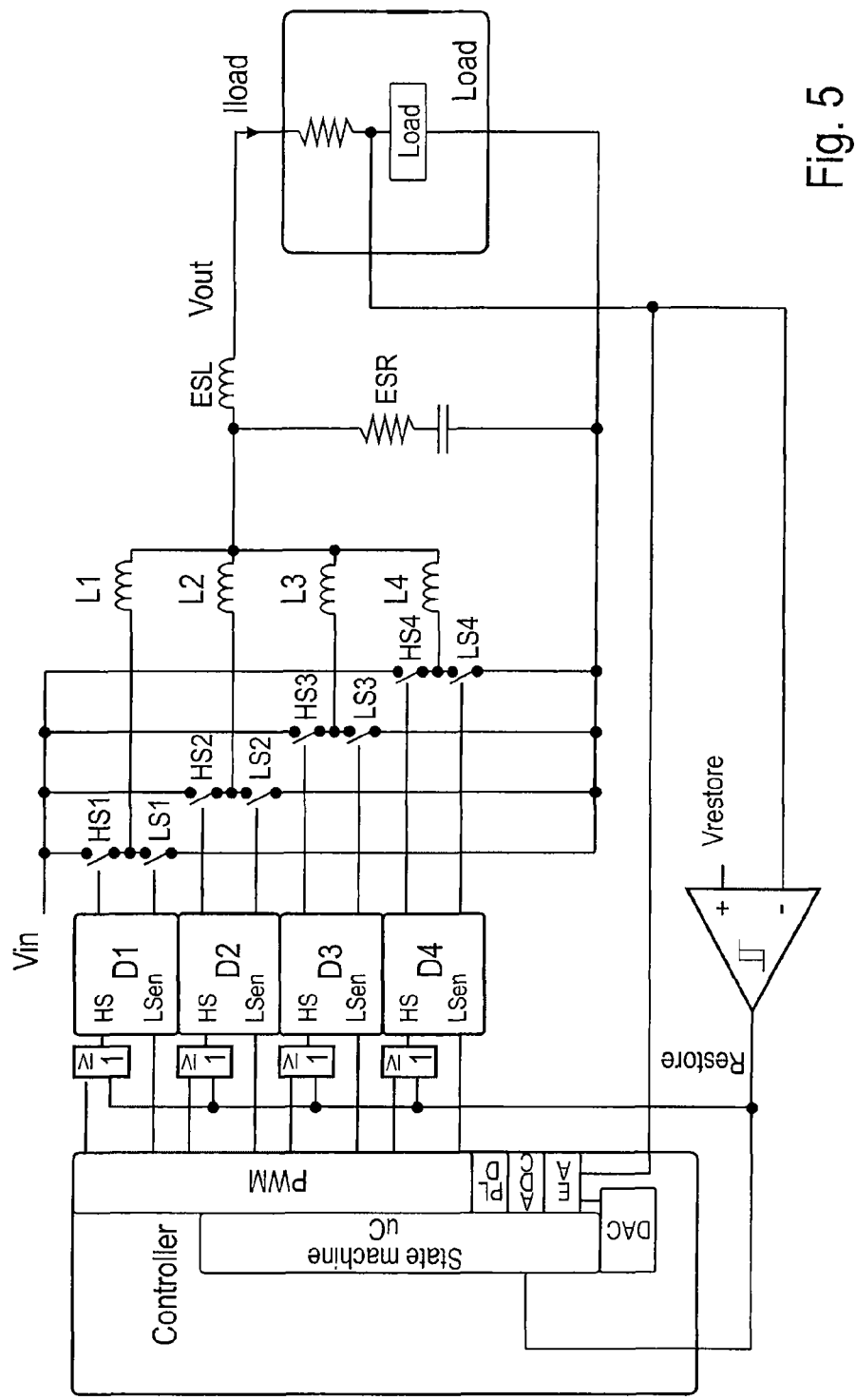

In the associated illustrations:

FIG. 1 show a block circuit diagram of a DC-to-DC converter for generating a voltage Vout with a comparator (with hysteresis) for voltage regulation, FIG. 2 shows a voltage/time graph with limit values associated with a voltage profile of the voltage Vout and with the profiles of the voltages of phases 1 to 4 from FIG. 1, FIG. 3 shows a block circuit diagram of a DC-to-DC converter for generating a voltage Vout with a comparator (with hysteresis) for voltage regulation and a differentiating stage, FIG. 4 shows a voltage/time graph with limit values associated with a voltage profile of the voltage Vout and with the profiles of the voltages of the phases 1 to 4 from FIG. 3, and FIG. 5 shows a modification of the arrangement shown in FIG. 3.

DETAILED DESCRIPTION

The principle is illustrated using the example of a 4-phase digital DC/DC controller. It is not restricted to this embodiment. The illustrated method can also be used for single-phase digital controllers or for analog multi-phase and single-phase controllers.

The mode of operation is illustrated with reference to a block circuit diagram in FIG. 1 and to a graph illustrating the associated voltage/time profiles in FIG. 2. The DC-to-DC converter illustrated in FIG. 1 comprises, by way of example, a controller for controlling the arrangement itself, logic gates, gate drivers D1 to D4, the high-side switches HS1, HS2, HS3 and HS4, the low-side switches LS1, LS2, LS3 and LS4 and the inductances L1 to L4 at the output of the converter, at which the output voltage (control voltage) $V_{out}$ is provided. A load "Load" is connected at the output. The current $I_{load}$ flows through this load. In order to regulate the value of the voltage $V_{out}$, a comparator is interposed between the output of the converter and a control input of the controller, said comparator generating a control signal (Restore) by means of a comparison voltage $V_{restore}$.

It is assumed that at the beginning the DC-to-DC converter operates in a DCM/PFM operating mode, wherein a low load current flows at the output and/or is operated with fewer than the maximum number of possible phases.

For the case where the load current $I_{load}$ increases quickly, the output voltage $V_{out}$ will become correspondingly lower. This voltage dip is illustrated at time "t1" in FIG. 2. The upper illustration in FIG. 2 shows the two switching thresholds (PWM-limit and Panic-limit) at which the generated control signal "Restore" switches.

If the voltage $V_{out}$, which is applied to the comparator shown in FIG. 1, falls below the value of the voltage $V_{restore}$, which is applied as comparison voltage at an input of the comparator, the control signal "Restore" is applied at the output of the comparator by said comparator. This corresponds to the time when the output voltage, as indicated at the top in FIG. 2, falls below the panic threshold. With this "Restore" signal, all of the high-side switches HS1, HS2, HS3 and HS4 are turned on by means of the logic gates and the PWM gate drivers D1, D2, D3 and D4.

By virtue of this operation, the drop in the voltage $V_{out}$ is compensated for and the voltage increases again, as is illustrated in the lower part of FIG. 2 with the rise of the current in all four phases after time t2. This voltage rise of $V_{out}$, taking into consideration the hysteresis of the comparator which can be implemented in programmable fashion, results in a disconnection of the control signal "Restore" at the output of the comparator at the time when the output voltage reaches the PWM-limit threshold, as shown at the top in FIG. 2. This results in the transition to the normal PWM mode (CCM mode) of the DC-to-DC converter and in transfer to the normal control loop.

This method becomes more effective the more noticeable the parasitic physically provided resistances (ESR) and inductances (ESL) of the capacitances and the printed circuit board at the output. This is particularly the case in the case of rapid and high load current changes and when using low capacitances.

A second extended method for phase correction will be described below with reference to FIGS. 3, 4 and 5. In this regard, FIG. 3 shows an arrangement according to FIG. 1 extended by a differentiating stage and FIG. 4 shows the voltage/time profiles associated with the arrangement shown in FIG. 3.

As previously, it is assumed that, at the beginning, the DC-to-DC converter operates in a DCM/PFM operating mode, wherein a low load current is connected or operation is with fewer than the maximum number of possible phases.

When the load current $I_{load}$ increases rapidly, the output voltage $V_{out}$ becomes correspondingly lower. This voltage dip is shown at time t1 in FIG. 4.

A ratio between the voltage change of Vout and its associated change over time in accordance with dVout/dt is formed by means of the disclosed method with a means suitable for this purpose. FIG. 4 illustrates this with a steep drop in the ratio dVout/dt. The means is illustrated in FIG. 3 as a differentiating stage connected upstream of the comparator. The already known comparator, which generates the known control signal "Restore" at its output, is actuated by means of a second control voltage generated by this differentiating stage. The control signal "Restore" generated in this way switches on all high-side switches HS1, HS2, HS3 and HS4 by means of the logic gates and by means of the PWM gate drivers D1, D2, D3 and D4, as was previously the case. By virtue of this operation, the drop in the voltage Vout is compensated for and the voltage increases again.

The ratio dVout/dt is low in value, as is illustrated by the rise of the function in FIG. 4. The voltage rise of Vout, taking into consideration the hysteresis of the comparator, results in a disconnection of the control signal "Restore" at the output of the comparator and therefore in the transition to the normal PWM mode of the DC-to-DC converter.

By virtue of the generation of the ratio dVout/dt, the compensation of the voltage dip of Vout already begins at time t1, as is illustrated in FIG. 4, which enables even quicker compensation of faults in the voltage Vout in comparison with the first-mentioned method shown in FIG. 1.

In one configuration of both variants, provision is made for parasitic components of the load (ESL and ESR) to be used for generating the control signal, as is illustrated in FIG. 5, in order to achieve the above-described rapid compensation for a voltage dip in the voltage Vout.

For this purpose, a tap at the load is used, as is illustrated in FIG. 5. This tap is either connected directly to the comparator input, as shown in FIG. 5, or can be connected to the differentiating element in a similar manner to that shown in FIG. 3 in order to generate the control signal "Restore". The principle is shown using the example of a 4-phase digital DC/DC controller. It is not restricted to this embodiment. The method illustrated can also be used for single-phase digital controllers or for analog multi-phase and single-phase controllers.

The invention claimed is:

1. An arrangement for improving transient deviation compensation of an output voltage $V_{out}$, comprising a DC-to-DC converter with a control unit controlling the converter for generating the output voltage $V_{out}$ at an output of the DC-to-DC converter, wherein the DC-to-DC converter includes gate drivers, logic gates connected between the control unit and respective gate drivers, and high-side switches connected to outputs of the respective gate drivers, wherein the output of the DC-to-DC converter is connected to a load, wherein a comparator is arranged between the output of the DC-to-DC converter and a control input of the control unit, with a first input of the comparator being connected to the output of the DC-to-DC converter, a second input of the comparator being connected to a reference voltage ($V_{restore}$), and the output of the comparator being connected to the control input of the control unit of the DC-to-DC converter and to an input of the logic gates, for controlling the output voltage $V_{out}$, wherein when the comparator determines that a value of the output voltage $V_{out}$ falls below a value of the reference voltage ($V_{restore}$) corresponding to a panic threshold, a control signal RESTORE is applied at the output of the comparator by the comparator causing the logic gates and gate drivers to turn on all of the high-side switches, and when the output voltage $V_{out}$ reaches a PWM-limit threshold, the control signal RESTORE is disconnected at the output of the comparator on account of programmable hysteresis of the comparator.

2. The arrangement as claimed in claim 1, wherein the first input of the comparator is connected to an output of a differentiating stage, and an input of the differentiating stage is connected to the output of the DC-to-DC converter.

3. The arrangement as claimed in claim 2, wherein the value of the reference voltage ($V_{restore}$) corresponding to the panic threshold comprises a constant negative voltage.

4. The arrangement as claimed in claim 1, wherein the value of the reference voltage ($V_{restore}$) corresponding to the panic threshold comprises a constant positive voltage.

5. A method for improving transient detection compensation of an output voltage $V_{out}$ applied to a load, in which the output voltage $V_{out}$ is generated by a DC-to-DC converter which is controlled in an initial control loop operating mode by a control unit, wherein, in order to regulate the output voltage $V_{out}$ generated, a comparison between the output voltage $V_{out}$ and a reference voltage $V_{restore}$ is performed by a comparator, a first control voltage RESTORE is generated at an output of the comparator by the comparator when a predetermined comparison state is reached in the comparator and transmitted to the control unit in such a way that, controlled by said first control voltage RESTORE, all driver stages of the DC-to-DC converter are switched on, the predetermined comparison state occurring when a value of the output voltage $V_{out}$ falls below a value of the reference voltage corresponding to a panic threshold, and, when a value of the output voltage $V_{out}$ reaches a PWM-limit threshold, the first control signal RESTORE is disconnected at the output of the comparator on account of programmable hysteresis of the comparator, and the DC-to-DC converter is controlled by the control unit in the initial control loop operating mode again.

6. The method as claimed in claim 5, wherein a second control voltage is generated from the voltage $V_{out}$, and the generation of the first control voltage RESTORE is regulated by said second control voltage.

7. The method as claimed in claim 6, wherein the generation of the second control voltage is performed by a differentiating stage connected upstream of the comparator in such a way that a ratio between a voltage change in the voltage $V_{out}$ within an associated time segment is formed in accordance with $dV_{out}/dt$, and the second control signal is provided as an input to the comparator.

8. The method as claimed in claim 7, wherein the value of the reference voltage ($V_{restore}$) corresponding to the panic threshold comprises a constant negative voltage.

9. The method as claimed in claim 5, wherein a parasitic component of the load is employed to generate the first control voltage.

10. The method as claimed in claim 5, wherein the value of the reference voltage ($V_{restore}$) corresponding to the panic threshold comprises a constant positive voltage.

\* \* \* \* \*